(12) United States Patent
Kuo et al.

(10) Patent No.: US 10,695,976 B2
(45) Date of Patent: Jun. 30, 2020

(54) MULTIPLE LIGHT SOURCE CORRECTION APPARATUS AND METHOD OF USE THEREOF

(71) Applicants: XYZPRINTING, INC., New Taipei (TW); KINPO ELECTRONICS, INC., New Taipei (TW)

(72) Inventors: Tsung-Hua Kuo, New Taipei (TW); Ming-Hsiung Ding, New Taipei (TW); Chung-Yen Gir, New Taipei (TW)

(73) Assignees: XYZPRINTING, INC., New Taipei (TW); KINPO ELECTRONICS, INC., New Taipci (TW)

( * ) Notice: Subject to any disclaimer, the term of this patent is extended or adjusted under 35 U.S.C. 154(b) by 310 days.

(21) Appl. No.: 15/688,199

(22) Filed: Aug. 28, 2017

(65) Prior Publication Data
US 2018/0370124 A1    Dec. 27, 2018

(30) Foreign Application Priority Data
Jun. 26, 2017    (CN) .......................... 2017 1 0523809

(51) Int. Cl.
| | |
|---|---|
| *B29C 64/129* | (2017.01) |
| *B33Y 50/02* | (2015.01) |
| *B29C 64/20* | (2017.01) |
| *B29C 64/386* | (2017.01) |
| *G02B 26/08* | (2006.01) |
| *B29C 64/277* | (2017.01) |

(52) U.S. Cl.
CPC ............ *B29C 64/129* (2017.08); *B29C 64/20* (2017.08); *B29C 64/386* (2017.08); *B33Y 50/02* (2014.12); *G02B 26/08* (2013.01); *B29C 64/277* (2017.08)

(58) Field of Classification Search
None
See application file for complete search history.

(56) References Cited

U.S. PATENT DOCUMENTS

| | | | | |
|---|---|---|---|---|
| 5,849,437 A | * | 12/1998 | Yamazaki | B82Y 10/00 430/5 |
| 2002/0142597 A1 | * | 10/2002 | Park | G03F 1/36 438/689 |

* cited by examiner

*Primary Examiner* — Monica A Huson
*Assistant Examiner* — Kelsey C Grace
(74) *Attorney, Agent, or Firm* — Chun-Ming Shih; HDLS IPR Services

(57) ABSTRACT

A multiple light source correction apparatus and a method of use thereof are disclosed. The multiple light source correction apparatus (10) comprises a transparent thin plate (1) having a first correction pattern (12), a second correction pattern (13) and at least one third correction pattern (14). The first correction pattern (12) includes a first straight line (121) having first and second end points (1211, 1212). The second correction pattern (13) includes a second straight line (131) and two U-shaped frames (132). The second straight line (131) includes third and fourth end points (1311, 1312). The two U-shaped frame (132) is installed at externals of the third and fourth end points (1311, 1312) respectively. The third correction pattern (14) includes a third straight line (141) having fifth and sixth end points (1411, 1412). The first, second and third straight lines (121, 131, 141) are arranged parallel to each other.

7 Claims, 23 Drawing Sheets

Providing a multiple light source correction apparatus, the multiple light source correction apparatus comprising a transparent thin plate, the transparent thin plate having a first correction pattern, a second correction pattern and at least one third correction pattern; the first correction pattern having a first straight line, the first straight line having a first end point and a second end point formed at two ends thereof; the second correction pattern having a second straight line and two U-shaped frames, the second straight line having a third end point and a fourth end point formed on two ends thereof, the two U-shaped frame installed at external portions of the third end point and the fourth end point respectively; the third correction pattern having a third straight line, the third straight line having a fifth end point and a sixth end point formed at two ends thereof; the first straight line, the second straight line and the third straight line arranged parallel to each other — a Providing a light source module, the light source module comprising a platform, a first light source and at least one second light source; the first light source and the second light source installed on the platform respectively; the first light source defining a first rear end pixel and a second rear end pixel; the second light source defining a third rear end pixel and a fourth rear end pixel; placing the platform underneath the transparent thin plate and defining a first directional axis and a second directional axis perpendicular to each other and parallel to the transparent thin plate — b Moving the platform along the first directional axis to allow the first light source to move to a position of the first correction pattern, followed by stacking the first rear end pixel onto the first end point, and allowing the transparent thin plate to rotate with the first end point as a center point in order to allow the second rear end pixel to stack onto the first straight line — c Moving the platform along the first directional axis to allow the first light source to move to a position of the second correction pattern, and allowing the first rear end pixel and the second rear end pixel to be received at an internal of the two U-shaped frames respectively — d

FIG.1A

MULTIPLE LIGHT SOURCE CORRECTION APPARATUS AND METHOD OF USE THEREOF

BACKGROUND OF THE INVENTION

Field of the Invention

The technical field relates to a calibration drawing paper for light sources, in particular, to a multiple light source correction apparatus and a method of use thereof.

Description of Related Art 3D printing refers to the technique of converting the data of a 3D model constructed by computer aided design (CAD) software into a multiple thin material layers for continuous stacking. In addition, the deposition of the material layers is then harden naturally or is cured with the use of an intense light source such that the layers are harden to form a 3D object desired.

Currently, the light sources used for curing the material are mostly laser light sources. However, due to the limitation on the corresponding optical structure required for laser light sources, laser light sources still require a certain focal length; in other words, a fixed distance is required to be maintained between the light source and the formation material. Consequently, when the 3D object to be created is relatively large, more than two light sources are needed for projecting light thereon for curing.

Nevertheless, the use of more than two light sources for curing has the following problems. Since the light source and the moving platform are subject to the misalignment issue and light sources are also subject to the misalignment issue with each other, when the quantity of the light sources increases, the projection accuracy of the light sources become lower. Consequently, how to perform correction on the locations of multiple light sources in order to accurately cure and form the predefined object is a main task for developers in this field.

In view of the above, the inventor seeks to overcome the drawbacks of the prior arts based on the currently existing technology along with years of researches and utilization of academic principles as the goal for developing a novel solution.

SUMMARY OF THE INVENTION

The disclosure is directed to a multiple light source correction apparatus and a method of use thereof, which utilizes a first correction pattern, a second correction pattern and a third correction pattern jointly formed on a transparent thin plate. In addition, the first correction pattern, the second correction pattern and the third correction pattern can perform accurate correction and positioning on light sources correspondingly in order to reduce the misalignment between the light sources and the platform as well as the misalignment between the multiple light sources. Therefore, it is of the advantages of accurate correction and facilitated operation for a multiple light source correction apparatus.

One of the exemplary embodiments provides a multiple light source correction apparatus, comprising: a transparent thin plate having a first correction pattern, a second correction pattern and at least one third correction pattern; the first correction pattern having a first straight line, the first straight line having a first end point and a second end point formed at two ends thereof; the second correction pattern having a second straight line and two U-shaped frames, the second straight line having a third end point and a fourth end point formed on two ends thereof, the two U-shaped frame installed at external portions of the third end point and the fourth end point respectively; the third correction pattern having a third straight line the third straight line having a fifth end point and a sixth end point formed at two ends thereof; the first straight line, the second straight line and the third straight line arranged parallel to each other.

Another one of the exemplary embodiments provides a method of use of a multiple light source correction apparatus, comprising the steps of: a) providing a multiple light source correction apparatus, the multiple light source correction apparatus comprising a transparent thin plate, the transparent thin plate having a first correction pattern, a second correction pattern and at least one third correction pattern; the first correction pattern having a first straight line, the first straight line having a first end point and a second end point formed at two ends thereof; the second correction pattern having a second straight line and two U-shaped frames, the second straight line having a third end point and a fourth end point formed on two ends thereof, the two U-shaped frame installed at external portions of the third end point and the fourth end point respectively; the third correction pattern having a third straight line, the third straight line having a fifth end point and a sixth end point formed at two ends thereof; the first straight line, the second straight line and the third straight line arranged parallel to each other; b) providing a light source module, the light source module comprising a platform, a first light source and at least one second light source; the first light source and the second light source installed on the platform respectively; the first light source defining a first rear end pixel and a second rear end pixel; the second light source defining a third rear end pixel and a fourth rear end pixel; placing the platform underneath the transparent thin plate and defining a first directional axis and a second directional axis perpendicular to each other and parallel to the transparent thin plate; c) moving the platform along the first directional axis to allow the first light source to move to a position of the first correction pattern, followed by stacking the first rear end pixel onto the first end point, and allowing the transparent thin plate to rotate with the first end point as a center point in order to allow the second rear end pixel to stack onto the first straight line; d) moving the platform along the first directional axis to allow the first light source to move to a position of the second correction pattern, and allowing the first rear end pixel and the second rear end pixel to be received at an internal of the two U-shaped frames respectively; e) rotating the transparent thin plate with the first end point as a center point; moving the first light source relative to the platform and along the first directional axis in order to allow the first rear end pixel to stack onto the third end point and the second rear end pixel to stack onto the second straight line; f) moving the platform along the first directional axis to allow the second light source to move to a position of the third correction pattern, followed by moving the second light source relative to the platform and along the first directional axis in order to allow the third rear end pixel to stack onto the third straight line and arranged adjacent to the fifth end point; and g) moving the second light source relative to the platform and along the second directional axis in order to allow the fourth rear end pixel to stack onto the third straight line and arranged adjacent to the sixth end point.

BRIEF DESCRIPTION OF DRAWING

FIG. 1A shows a flow chart of step a) to step d) of a method of use of a multiple light source correction apparatus of the present invention;

DETAILED DESCRIPTION OF THE INVENTION

Figure 1B:
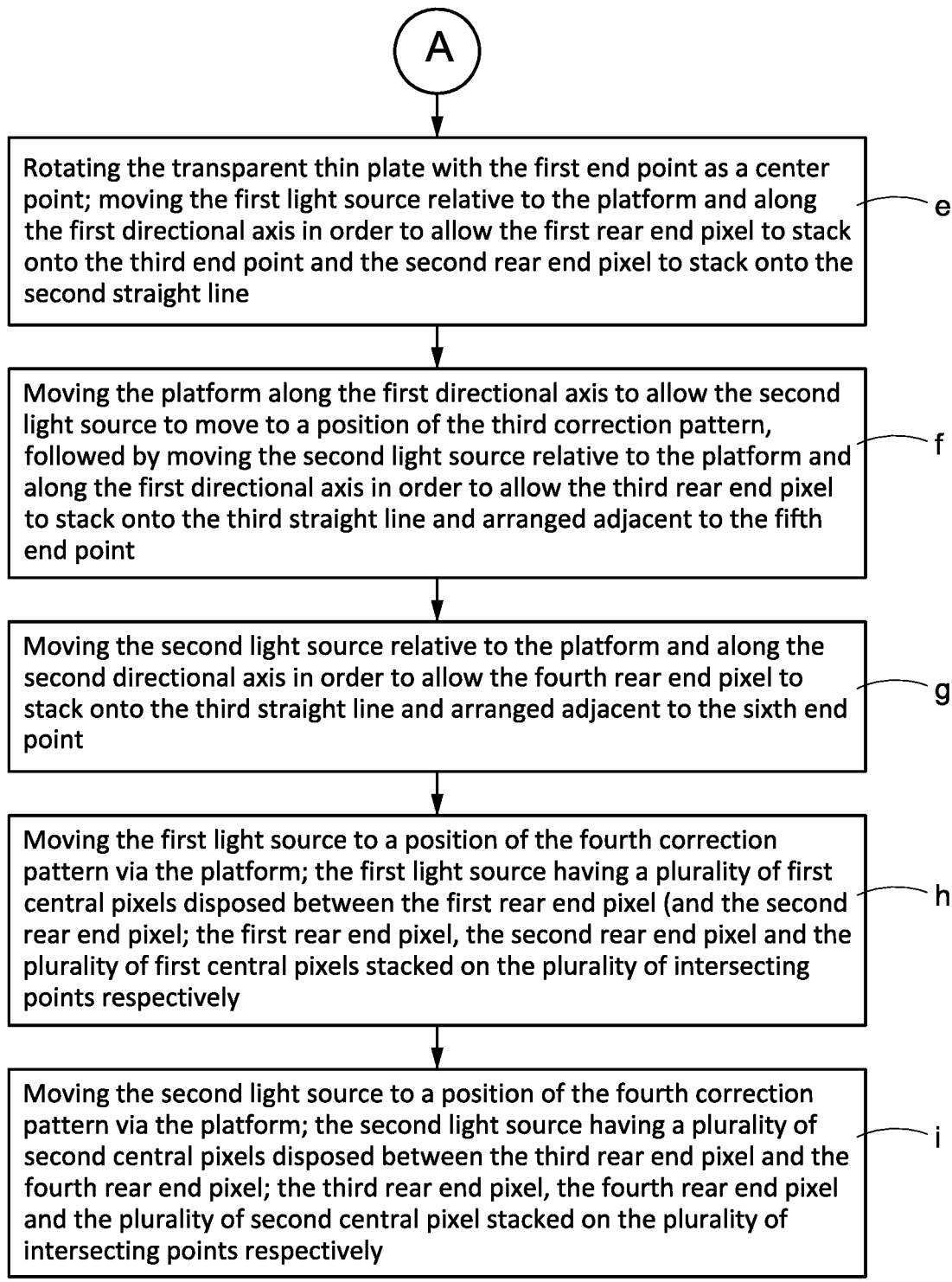
FIG. 1B shows a flow chart of step e) to step i) of a method of use of a multiple light source correction apparatus of the present invention.

The following provide a detailed description on the preferred embodiments of a signal feedback apparatus of the present invention along with the accompanied drawings.

Please refer to FIG. 1A. As shown in FIG. 1A to 22, the present invention provides s multiple light source correction apparatus and a method of use thereof. The multiple light source correction apparatus mainly comprises a transparent thin plate 1.

As shown in step a) of FIG. 1A and FIG. 2 to FIG. 4, a multiple light source correction apparatus 10 is disclosed. The multiple light source correction apparatus 10 comprises a transparent thin plate 1, and the transparent thin plate 1 includes a first correction pattern 12, a second correction pattern 13 and one or a plurality of third correction pattern 14. The first correction pattern 12 includes a first straight line 121, and the first straight line 121 includes a first end point 1211 and a second end point 1212 formed at two ends thereof. The second correction pattern 13 includes a second straight line 131 and two U-shaped frames 132. The second straight line 131 includes a third end point 1311 and a fourth end point 1312 formed at two ends thereof. The two U-shaped frames 132 are installed at the external portion of the third end point 1311 and the fourth end point 1312 respectively. The third correction pattern 14 includes a third straight line 141, and the third straight line 141 includes a fifth end point 1411 and a sixth end point 1412 formed at two ends thereof. The first straight line 121, the second straight line 131 and the third straight line 141 are arranged parallel to each other, and a first directional axis d1 and a second directional axis d2 perpendicular to each other are defined to be parallel with the transparent thin plate 1.

Figure 2:
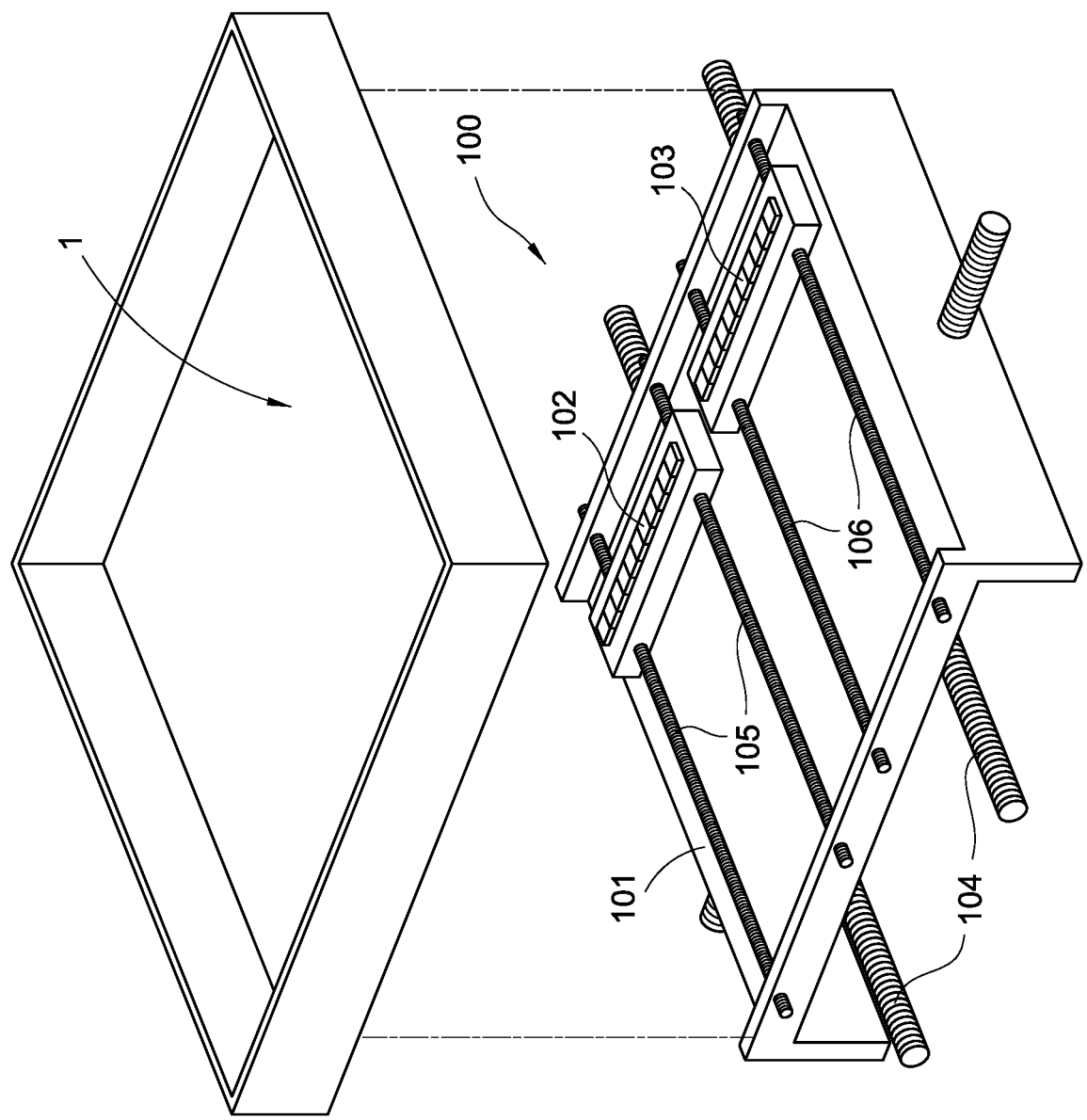
FIG. 2 is a schematic view of the platform of the present invention arranged underneath the transparent thin plate.
Figure 3:
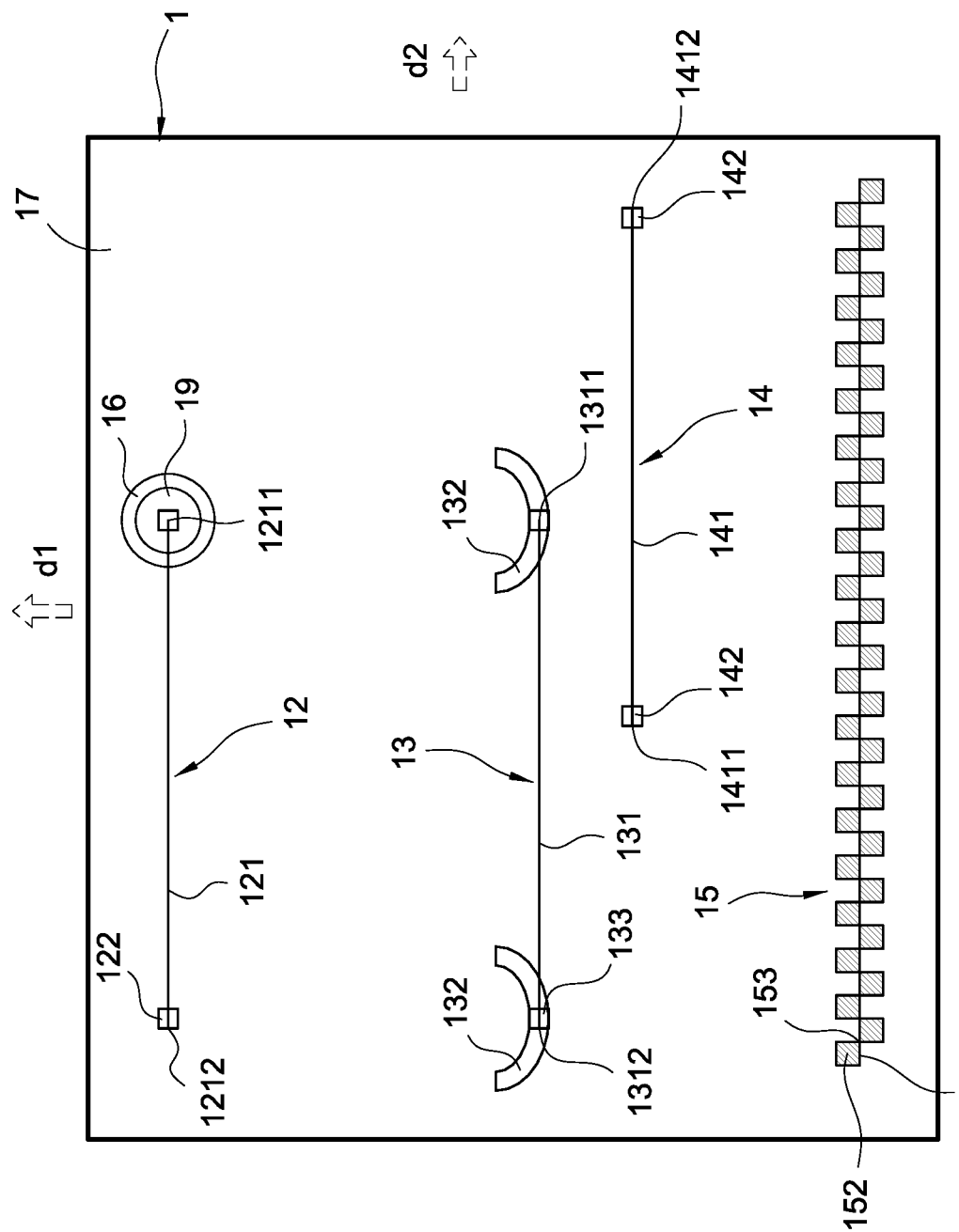
FIG. 3 is a top view of a multiple light source correction apparatus of the present invention.

The following provides further details. As shown in FIG. 2 to FIG. 3, the first straight line 121, the second straight line 131 and the third straight line 141 are of equal lengths with each other; wherein the first correction pattern 12 and the second correction pattern 13 are used for correcting the first light source 102, and the third correction pattern 14 is used for correcting the second light source 103. In addition, a gap is formed between the first light source 102 and the second light source 103; therefore, the first straight line 121 and the second straight line 131 are arranged in aligned positions with each other, whereas the second straight line 131 and the third straight line 141 are arranged in misaligned positions with each other.

Furthermore, as shown in FIG. 3, the first correction pattern 12 further includes a first ring frame 122. A rear section of the first straight line 121 adjacent the second end point 1212 is received inside the first ring frame 122, and the second end point 1212 is stacked onto the first ring frame 122.

In addition, as shown in FIG. 3, the second correction pattern 13 further includes a second ring frame 133, and the second ring frame 133 is received at a central portion inside one of the U-shaped frames 132. A rear section of the second straight line 131 adjacent to the fourth end point 1312 is received inside the second ring frame 133, and the fourth end point 1312 is stacked onto the second ring frame 133.

Moreover, as shown in FIG. 3, the third correction pattern 14 further includes two third ring frames 142. Two rear sections of the third straight line 141 are received inside the two third ring frames 142 respectively. In addition, the fifth end point 1411 is stacked onto one of the first third ring frames 142, and the sixth end point 1412 is stacked onto another one of the third ring frames 142.

Furthermore, as shown in FIG. 3, the transparent thin plate 1 further includes a fourth correction pattern 15. The fourth correction pattern 15 includes a fourth straight line 151 and a plurality of black grids 152 arranged at the upper and lower sides of the fourth straight line 151 in an alternating method spaced apart from each other. A plurality of intersecting points 153 are formed between the fourth straight line 151 and the plurality of black grids 152.

Figure 4:
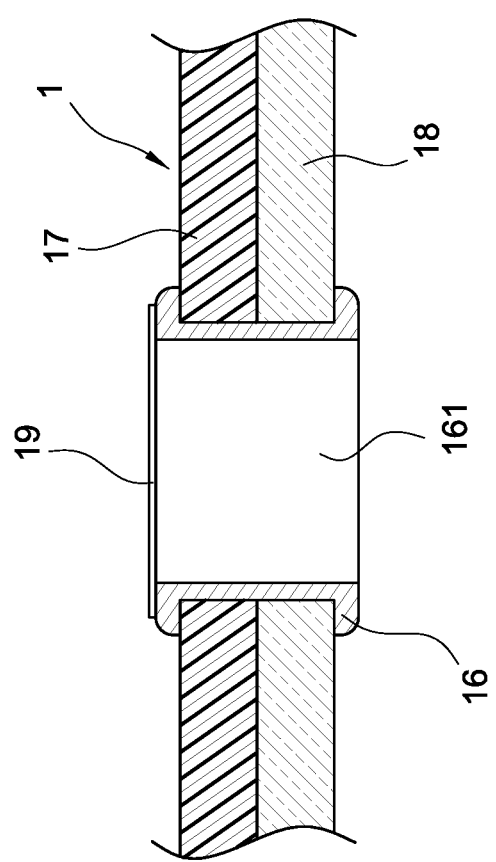
FIG. 4 is a cross sectional view of a multiple light source correction apparatus of the present invention.
Figure 5:
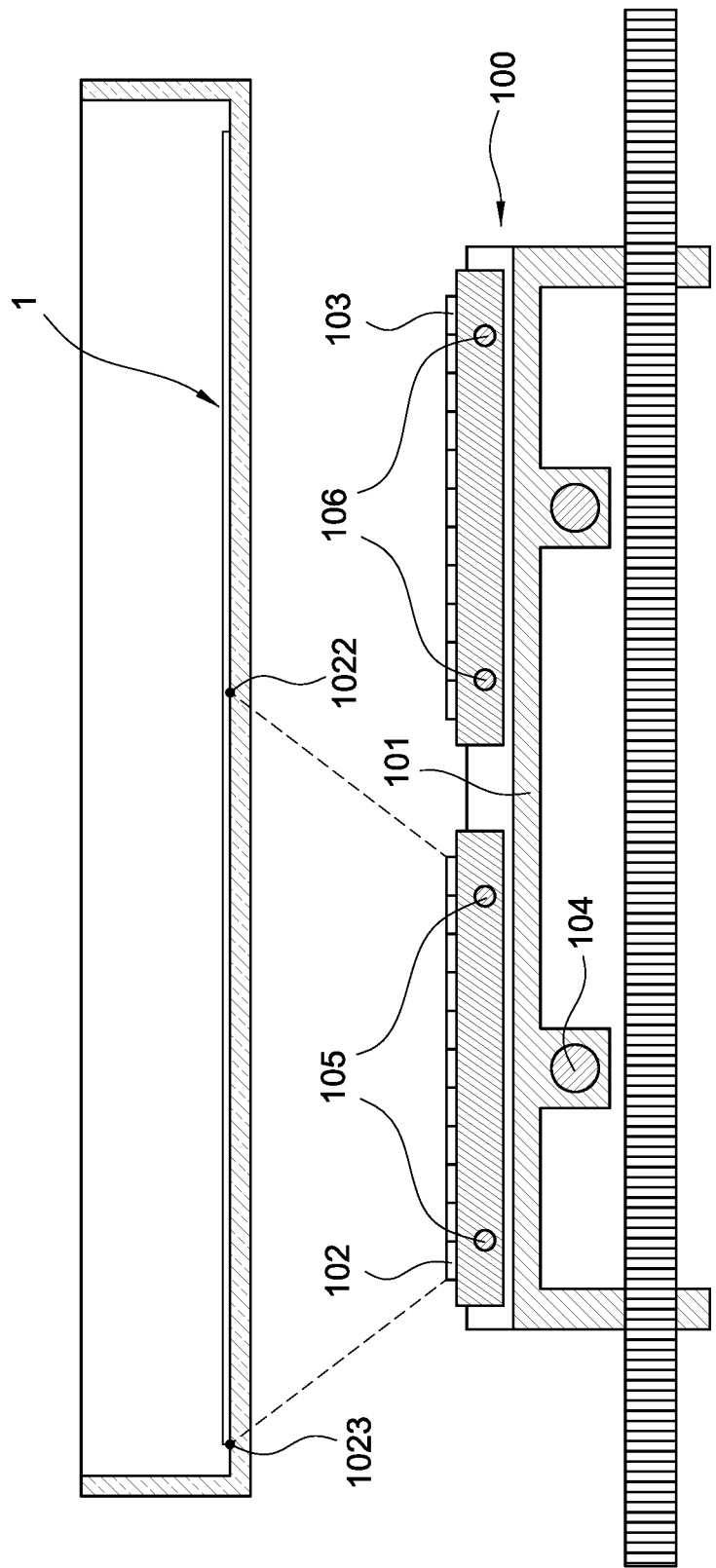
FIG. 5 is a schematic view of the first light source of the present invention defining the first rear end pixel and the second rear end pixel.
Figure 6:
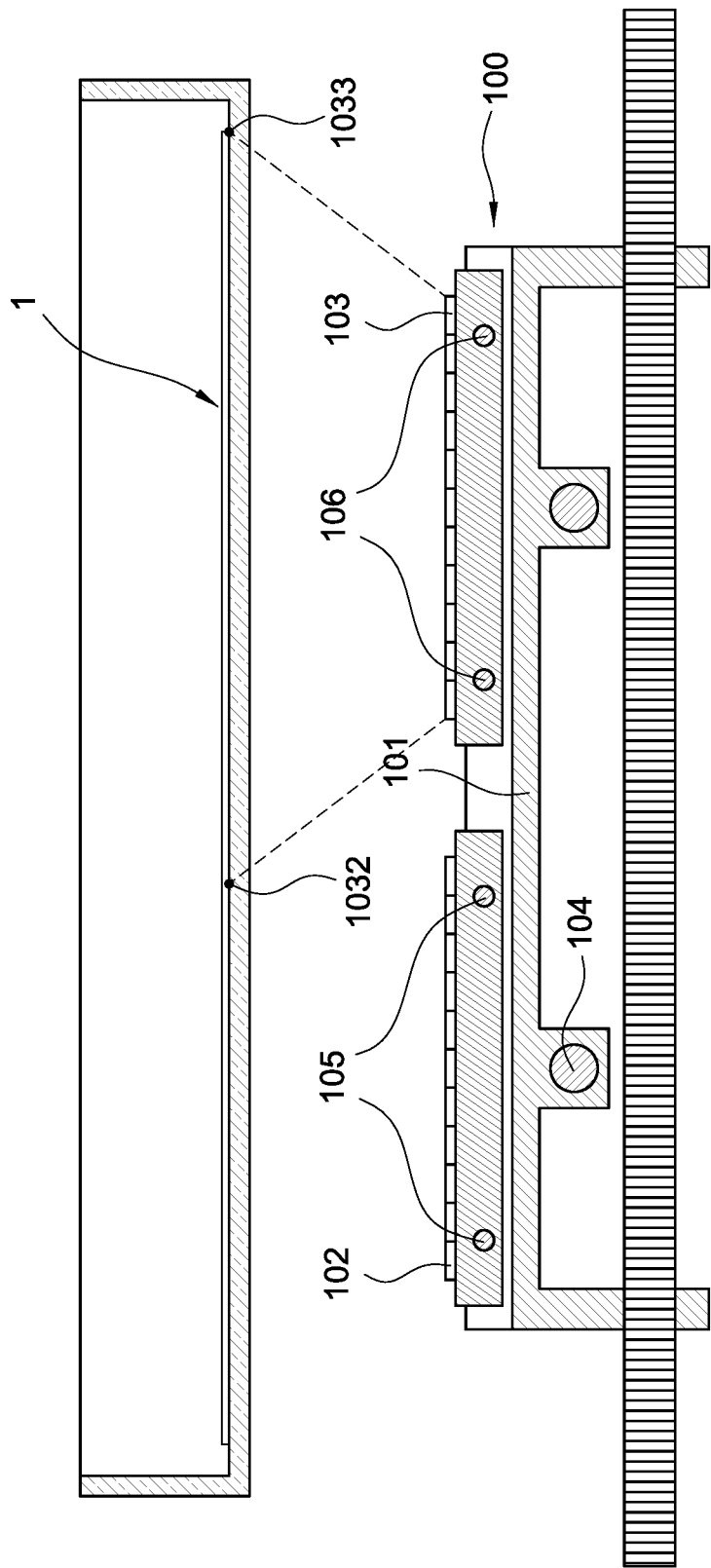
FIG. 6 is a schematic view of the second light source of the present invention defining the third rear end pixel and the fourth rear end pixel.
Figure 7:
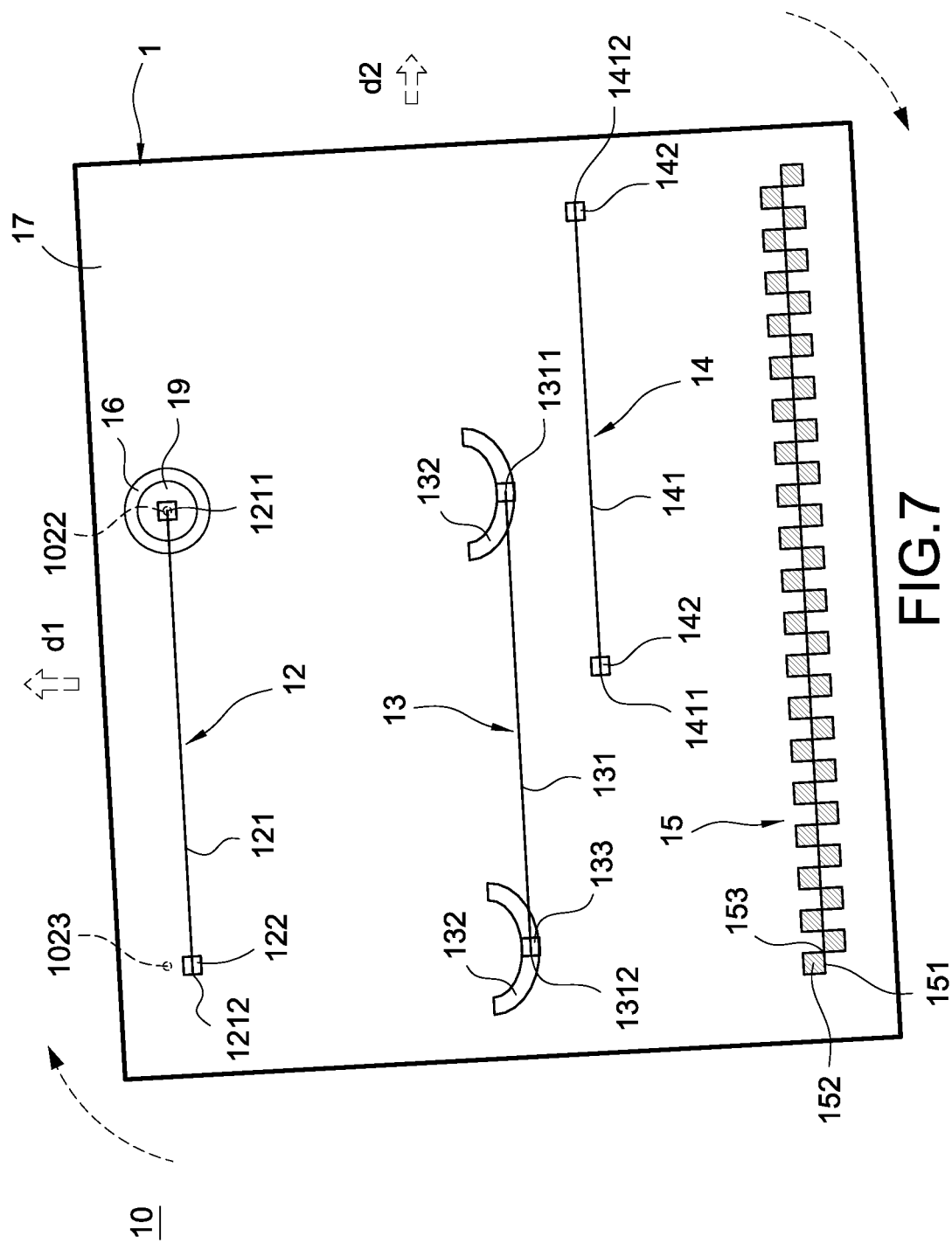
FIG. 7 is a schematic view of the transparent thin plate of the present invention using the first end point as the center point for rotation.
Figure 8:
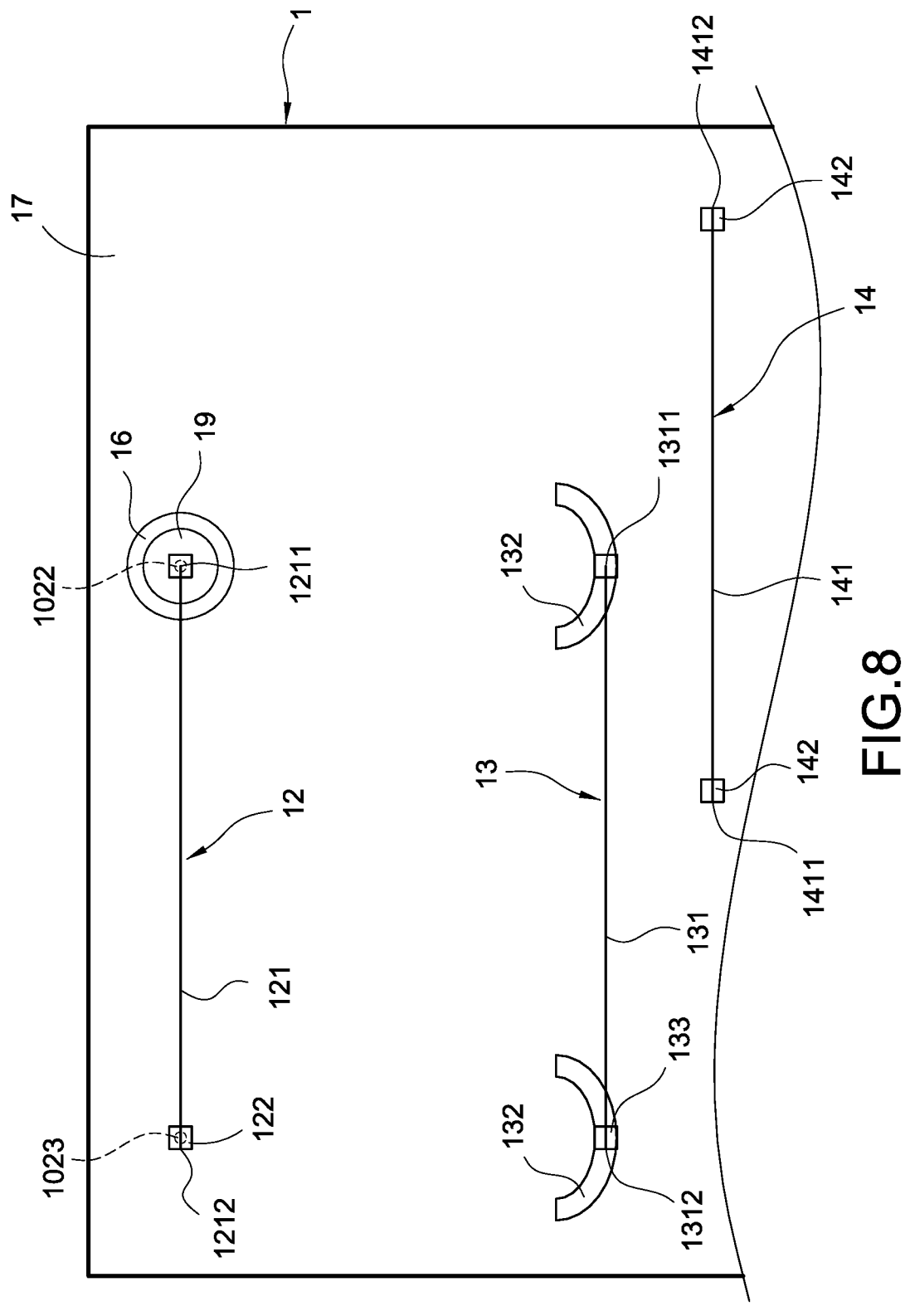
FIG. 8 is a schematic view of the second rear end pixel of the present invention stacked onto the first straight line.

Moreover, as shown in FIG. 3 to FIG. 4, the transparent thin plate 1 comprises a hollow rivet 16, a transparent rotating sheet 17, a transparent horizontal moving sheet 18 and a sticker sheet 19. The hollow rivet 16 includes a hollow opening 161. The transparent rotating sheet 17 and the transparent horizontal moving sheet 18 are stacked onto each other and mounted onto the hollow rivet 16. The sticker sheet 19 is attached on the hollow rivet 16 and coves the hollow opening 161. A portion of the first straight line 121, the second end point 1212, the second correction pattern 13 and the third correction pattern 14 are formed on the transparent rotating sheet 17. Another portion of the first straight line 121 and the first end point 1211 are formed on the sticker sheet 19.

As shown in step b) of FIG. 1A and FIG. 2, FIG. 4 to FIG. 6, a light source module 100 is provided. The light source module 100 comprises a platform 101, a first light source 102 and one or a plurality of second light source 103. The first light source 102 and the second light source 103 are installed on the platform 101 respectively. The first light source 102 defines a first rear end pixel 1022 and a second rear end pixel 1023. The second light source 103 defines a third rear end pixel 1032 and a fourth rear end pixel 1033. The platform 101 is arranged underneath the transparent thin plate 1.

Accordingly, the first light source 102 includes a first light beam formed by aligning a plurality of pixels into a row. The left most and right most pixels of the first light beam refer to the first rear end pixel 1022 and the second rear end pixel 1023 respectively. The second light source 103 includes a second light beam formed by aligning a plurality of pixels into a row. The left most and right most pixels of the second light beam refer to the third rear end pixel 1032 and the fourth rear end pixel 1033 respectively.

The following provides further description. As shown in FIG. 2 to FIG. 6, the light source module 100 further comprises a first driving mechanism 104, a second driving mechanism 105 and one or a plurality of third driving mechanism 106. The first driving mechanism 104 is connected to the platform 101 and drives the platform 101 to move along the first directional axis d1. The second driving mechanism 105 is connected to the first light source 102 and drives the first light source 102 to move relative to the platform 101 and along the first directional axis d1. The third driving mechanism 106 is connected to the second light source 103 and drives the second light source 103 to move relative to the platform 101 and along the first directional axis d1 or the second directional axis d2.

As shown in step c) of FIG. 1A and FIG. 5, FIG. 7 to FIG. 8, the platform 101 moves along the first directional axis d1 to allow the first light source 102 to move to the position of the first correction pattern 12, followed by stacking the first rear end pixel 1022 onto the first end point 1211, and allowing the transparent thin plate 1 to rotate with the first end point 1211 as the center point in order to allow the second rear end pixel 1023 to be stacked onto the first straight line 121.

Accordingly, when the transparent thin plate 1 rotates with the first end point 1211 as the center point, the transparent rotating sheet 17 and the transparent horizontal moving sheet 18 rotate together with the first end point 1211 as the center point.

In addition, when the second rear end pixel 1023 is stacked onto the first straight line 121, the second rear end pixel 1023 is received at the internal of the first ring frame 122, meaning that the transparent thin plate 1 and the first light source 102 have completed the alignment action. If the second rear end pixel 1023 is not received at the internal of the first ring frame 122, it means that the boundary of the first light source 102 exceeds the range such that correction cannot be made; therefore, the light source module 100 can then be recycled directly without further uses.

Figure 9:
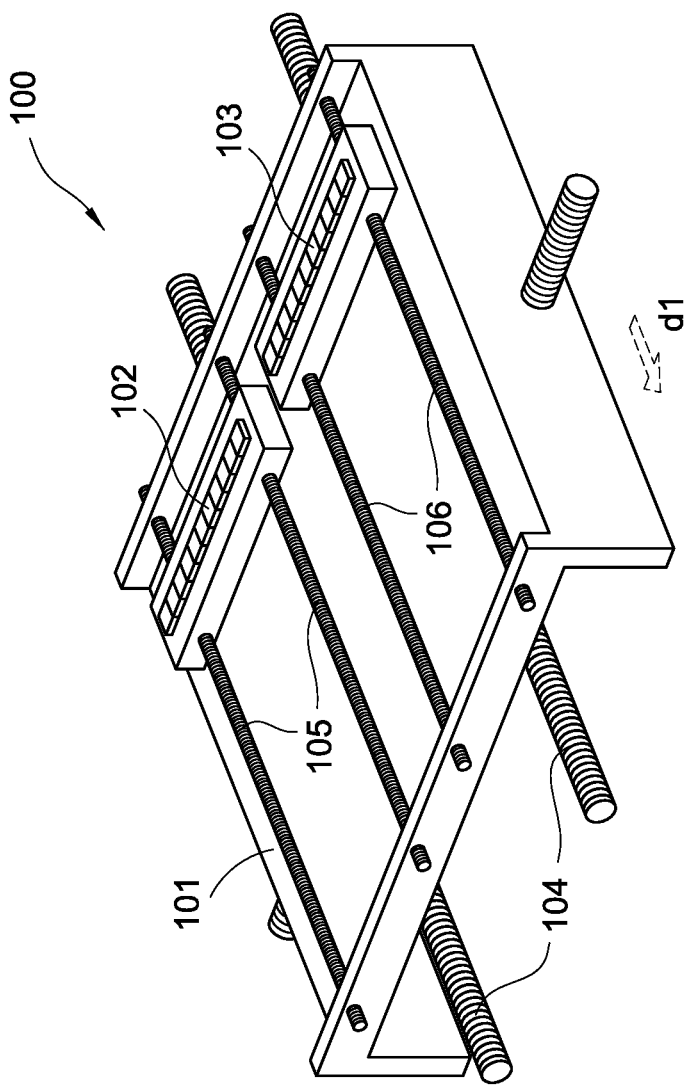
FIG. 9 is a schematic view of the platform of the present invention moving along the first directional axis.
Figure 10:
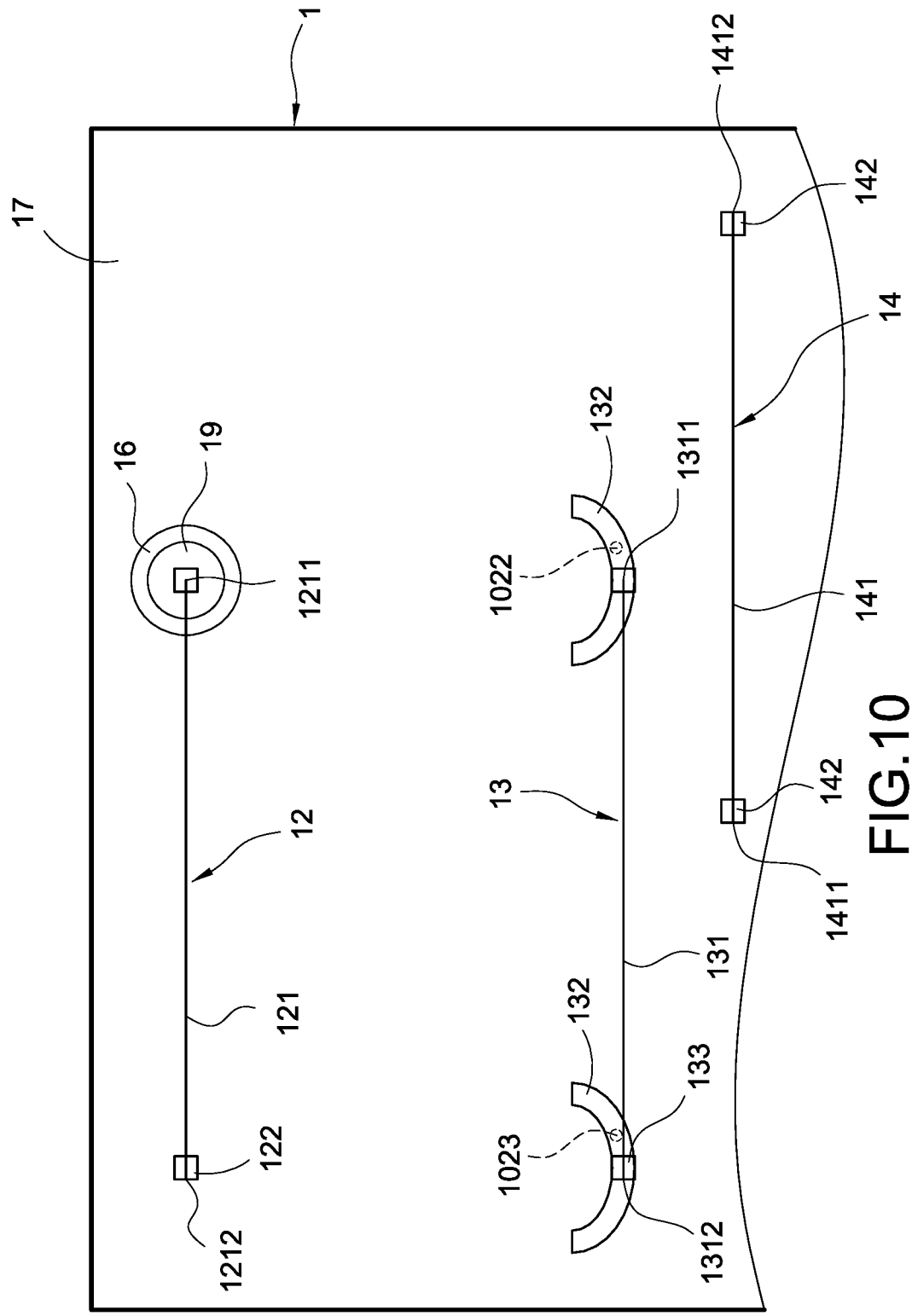
FIG. 10 is a schematic view of the first rear end pixel and the second rear end pixel of the present invention received at the internal of two U-shaped frames respectively.
Figure 11:
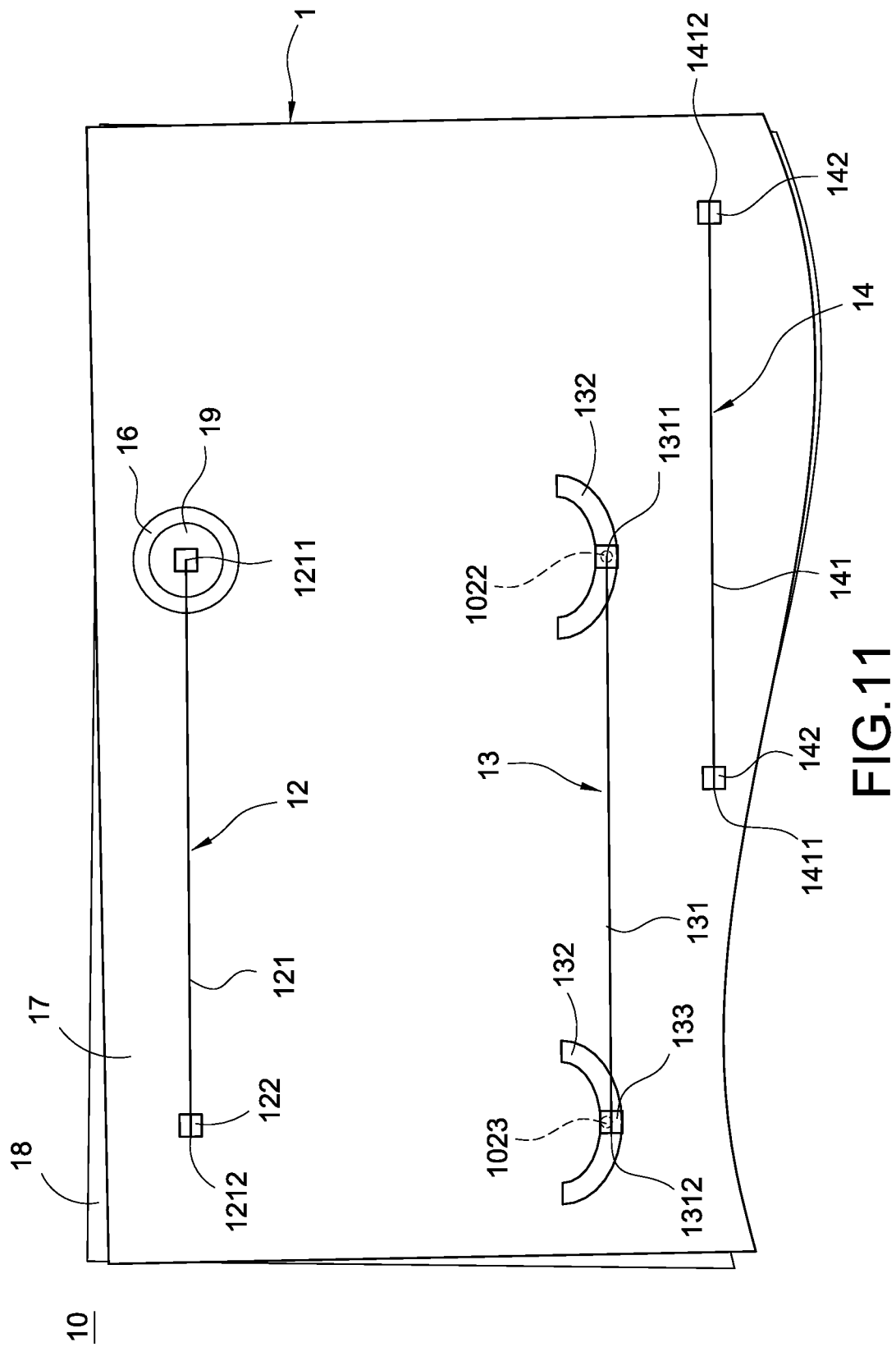
FIG. 11 is a schematic view of the first rear end pixel of the present invention stacked onto the third end point.
Figure 12:
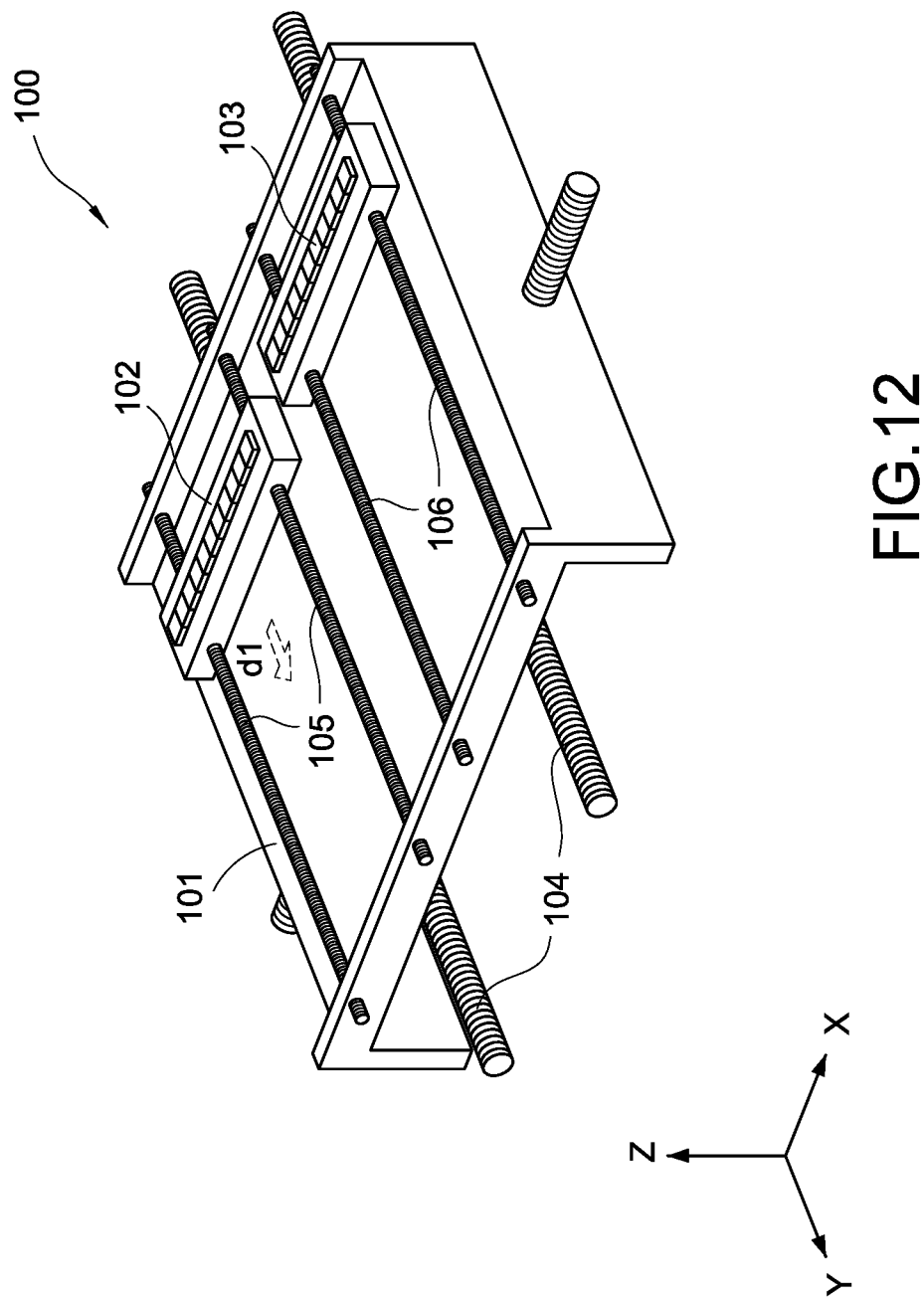
FIG. 12 is a schematic view of the first light source of the present invention moving relative to the platform and along the first directional axis.
Figure 13:
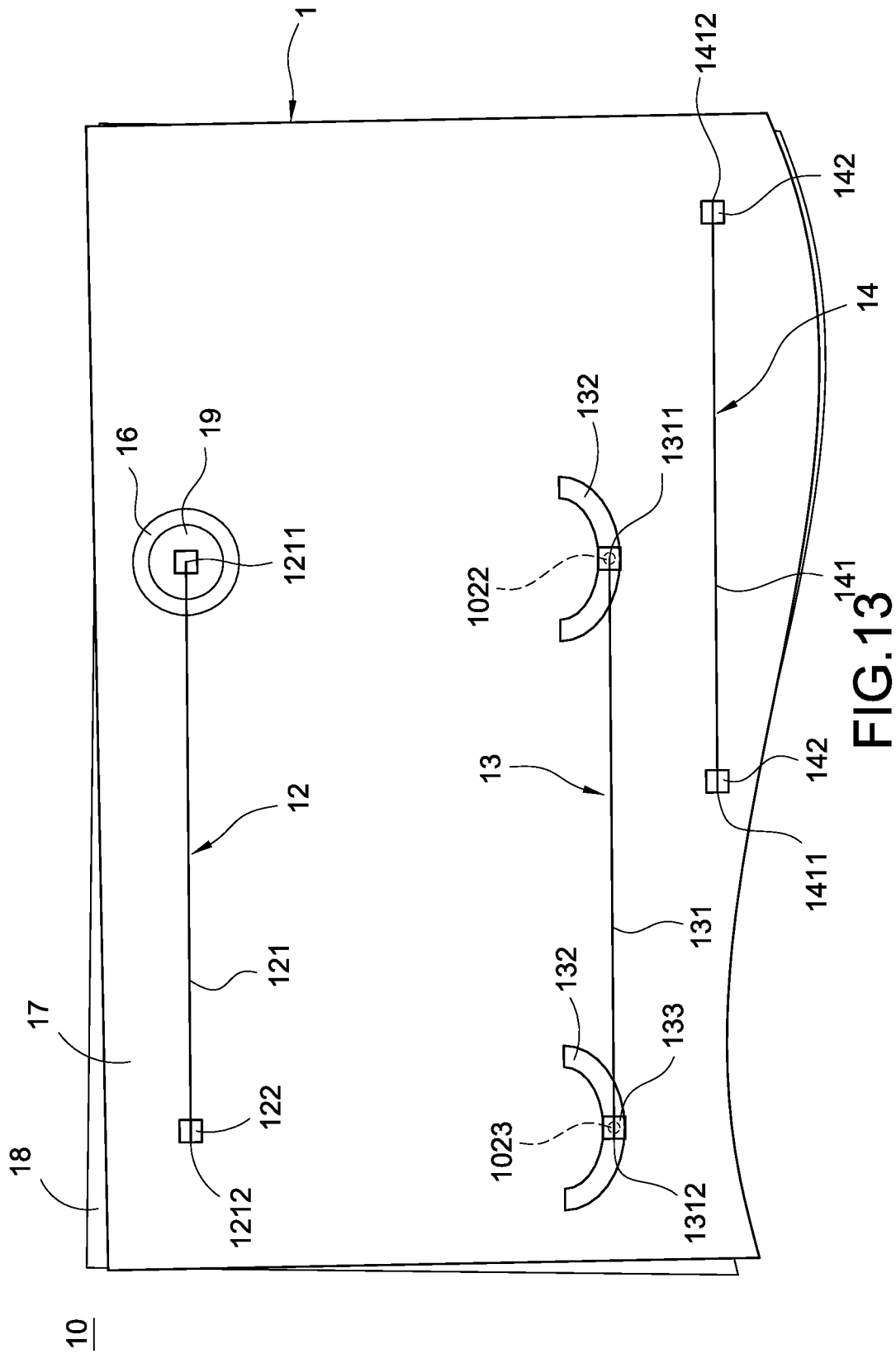
FIG. 13 is a schematic view of the second rear end pixel of the present invention stacked onto the second straight line.

As shown in step d) of FIG. 1A and FIG. 9 to FIG. 10, the platform 101 is moved along the first directional axis d1 in order to allow the first light source 102 to move to the position of the second correction pattern 13, and allowing the first rear end pixel 1022 and the second rear end pixel 1023 to be received at the internal of the two U-shaped frames 132 respectively. If the first rear end pixel 1022 and the second rear end pixel 1023 cannot be received at the internal of the two U-shaped frames 132, it means that the platform 101 is deformed such that correction cannot be made; therefore, the light source module 100 can then be recycled directly without further uses.

As shown in step e) of FIG. 1B and FIG. 11 to FIG. 13, the transparent thin plate 1 is rotated with the first end point 1211 as the center point. The first light source 102 is moved relative to the platform 101 and along the first directional axis d1 in order to allow the first rear end pixel 1022 to stack onto the third end point 1311 and the second rear end pixel 1023 to stack onto the second straight line 131.

Accordingly, when the transparent thin plate 1 is rotated with the first end point 1211 as the center point, the transparent rotating sheet 17 is rotated with the first end point 1211 as the center point, and the transparent horizontal moving sheet 18 is stationary without movements since the transparent horizontal moving sheet 18 has been positioned completely in step c).

Furthermore, when the second rear end pixel 1023 is stacked onto the second straight line 131, the second rear end pixel 1023 is received at the internal of the second ring frame 133, meaning that the platform 101 corrected completely has been perpendicular to the first directional axis d1. If the second rear end pixel 1023 cannot be received at the internal of the second ring frame 133, it means that the first driving mechanism 104 is deformed such that correction cannot be made; therefore, the light source module 100 can then be recycled directly without further uses.

Figure 14:
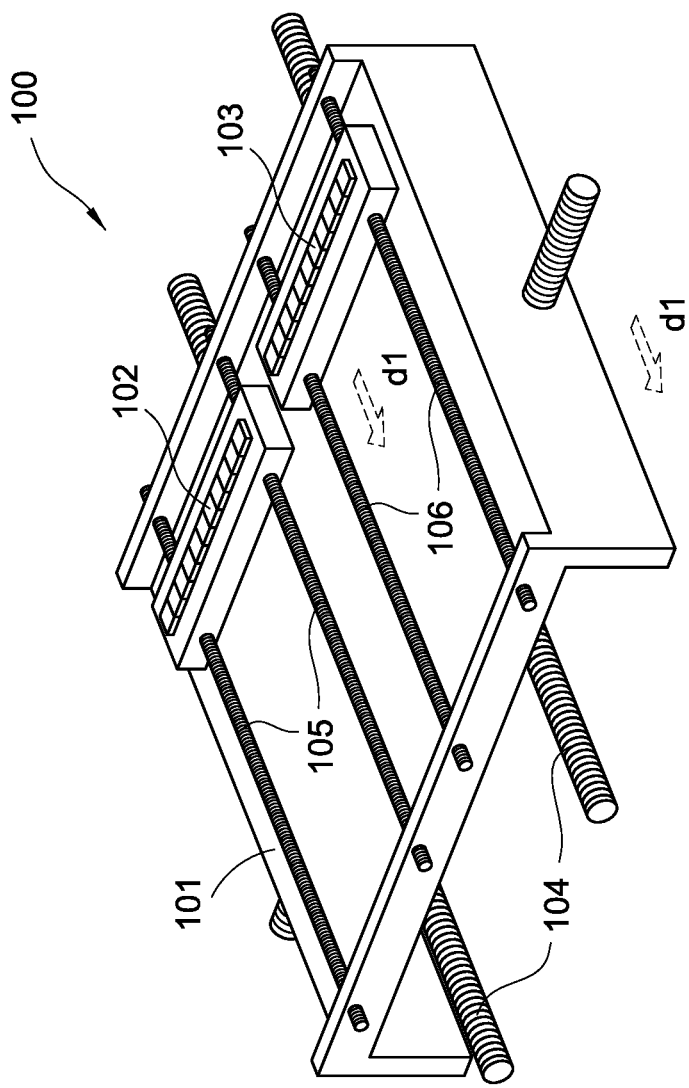
FIG. 14 is another schematic view of the platform of the present invention moving along the first directional axis.'
Figure 15:
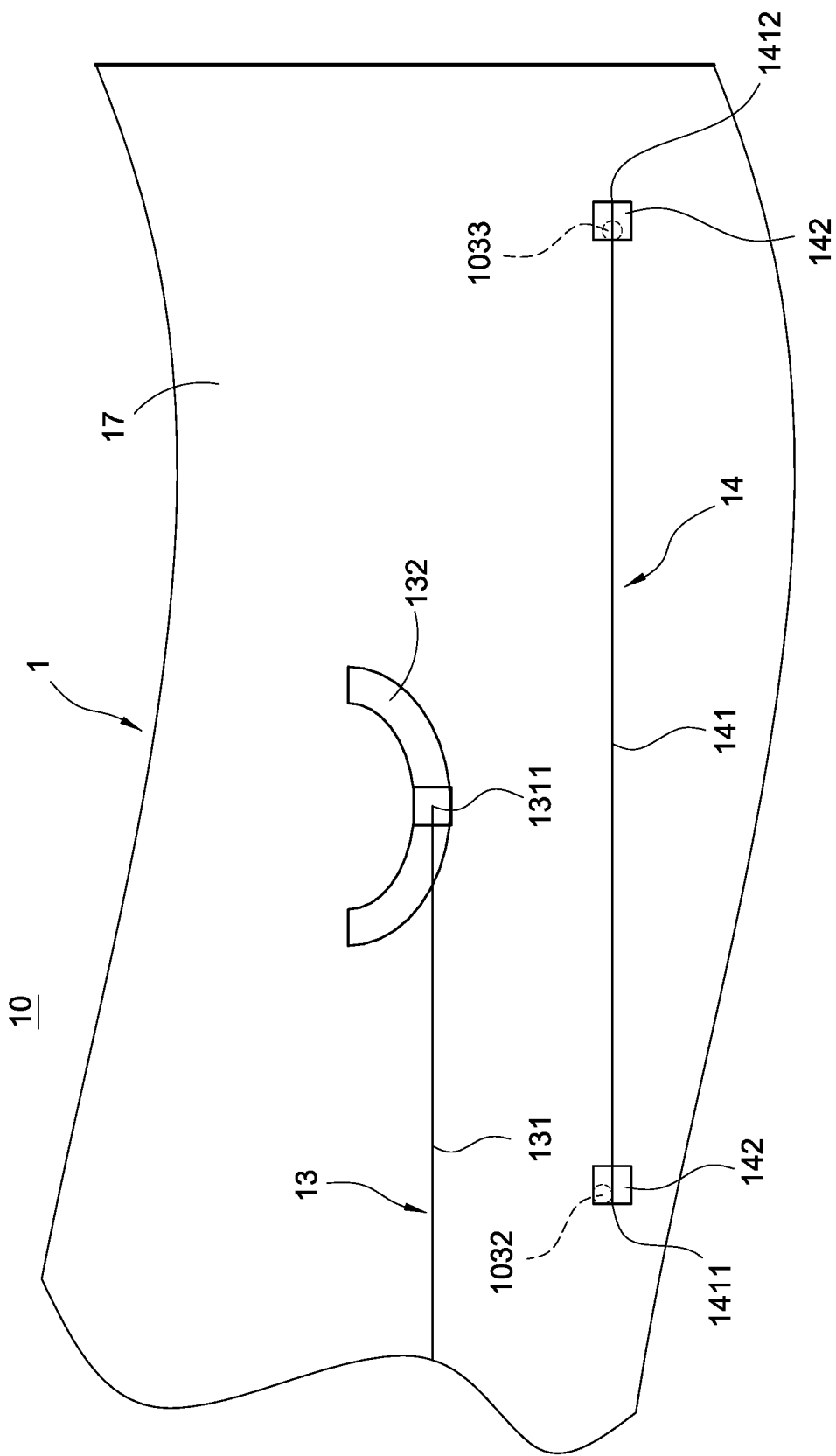
FIG. 15 is a schematic view of the third rear end pixel of the present invention stacked onto the third straight line and arranged adjacent to the fifth end point.

As shown in step f) of FIG. 1B and FIG. 14 to FIG. 15, the platform 101 is moved along the first directional axis d1 to allow the second light source 103 to move to the position of the third correction pattern 14, followed by moving the second light source 103 relative to the platform 101 and along the first directional axis d1 in order to allow the third rear end pixel 1032 to be stacked onto the third straight line 141 and arranged adjacent to the fifth end point 1411.

Accordingly, when the platform 101 is moved along the first directional axis d1 to allow the second light source 103 to move to the position of the third correction pattern 14, the third rear end pixel 1032 is received at the internal of one of the third ring frames 142, and the fourth rear end pixel 1033 is received at the internal of another one of the third ring frames 1342. If the third rear end pixel 1032 and the fourth rear end pixel 1033 cannot be received at the internal of the two third ring frames 142, it means that that the platform 101 is deformed such that correction cannot be made; therefore, the light source module 100 can then be recycled directly without further uses.

Figure 16:
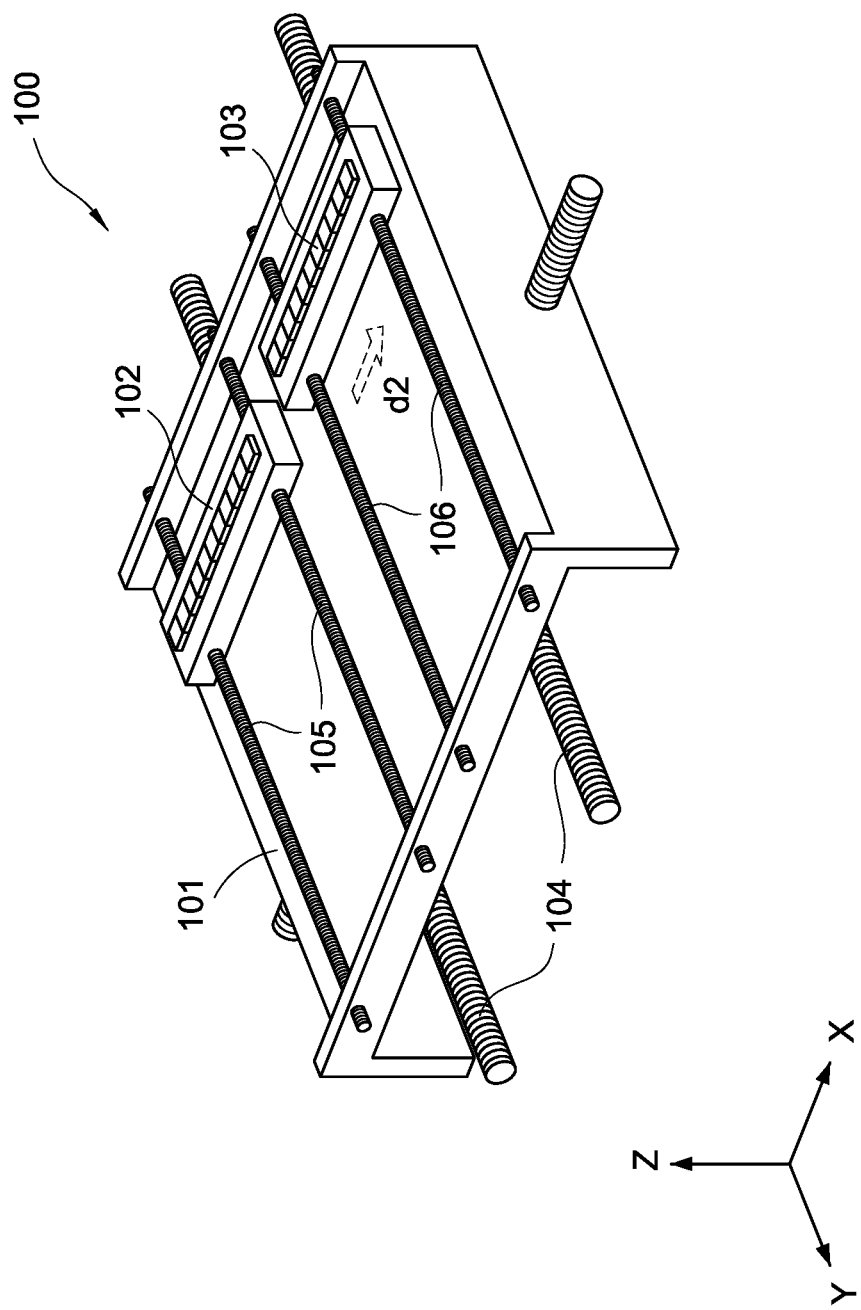
FIG. 16 is a schematic view of the second light source of the present invention moving relative to the platform and along the second directional axis.
Figure 17:
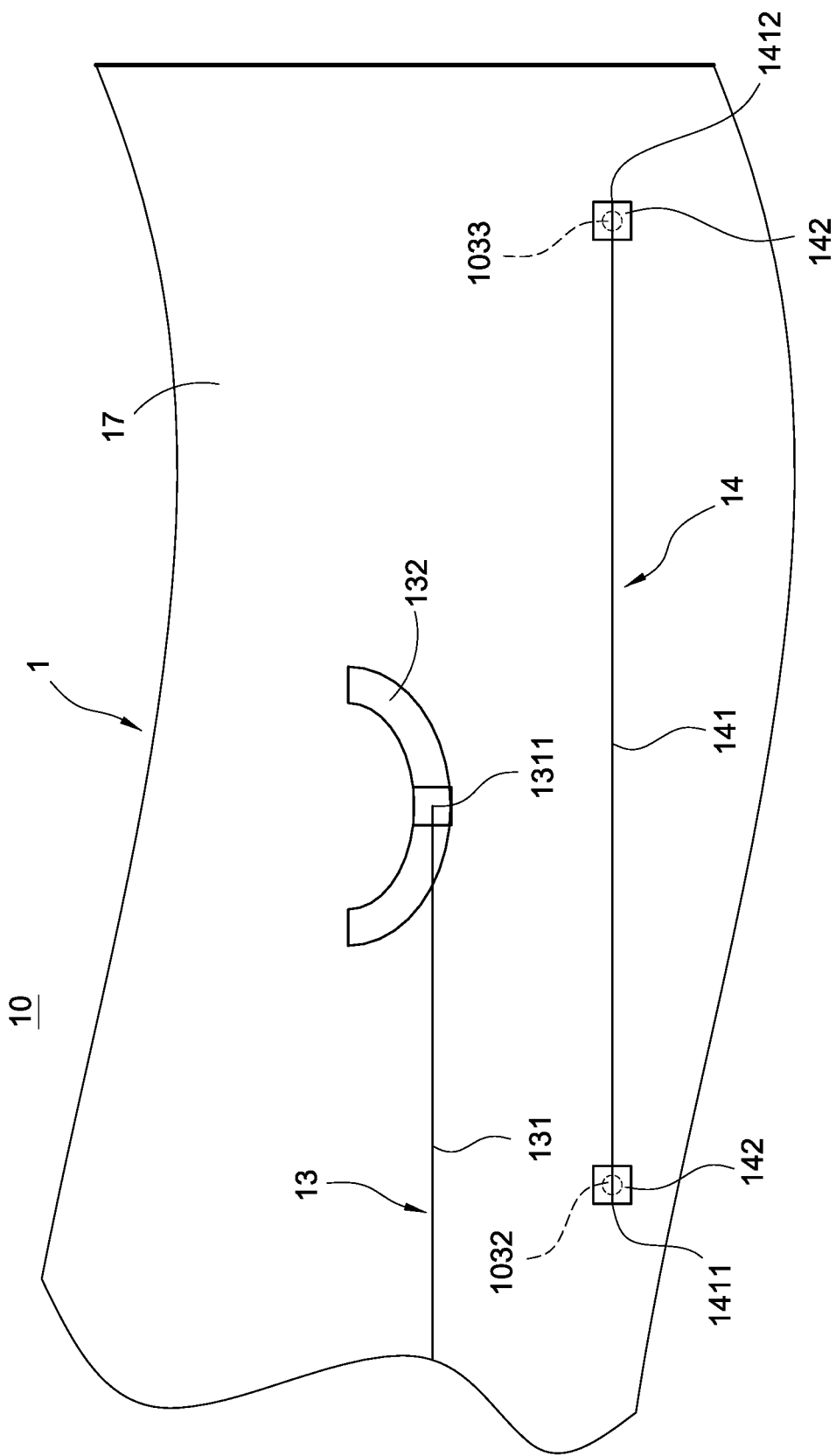
FIG. 17 is a schematic view of the fourth rear end pixel of the present invention stacked onto the third straight line and arranged adjacent to the sixth end point.

A shown in step g) and FIG. 16 to FIG. 17, the second light source 103 is moved relative to the platform 101 and along the second directional axis d2 in order to allow the fourth rear end pixel 1033 to stack onto the third straight line 141 and arranged adjacent to the sixth end point 1412.

Accordingly, when the fourth rear end pixel 1033 is stacked onto the third straight line 141, the fourth rear end pixel 1033 is received at the internal of another one of the third ring frames 142, meaning that the first light source 102 and the second light source 103 have completed the alignment action. If the fourth rear end pixel 1033 cannot be received at the internal of the another one of the third ring frames 142, it means that the boundary of the second light source 103 exceeds the range such that correction cannot be made; therefore, the light source module 100 can then be recycled directly without further uses.

Figure 18:
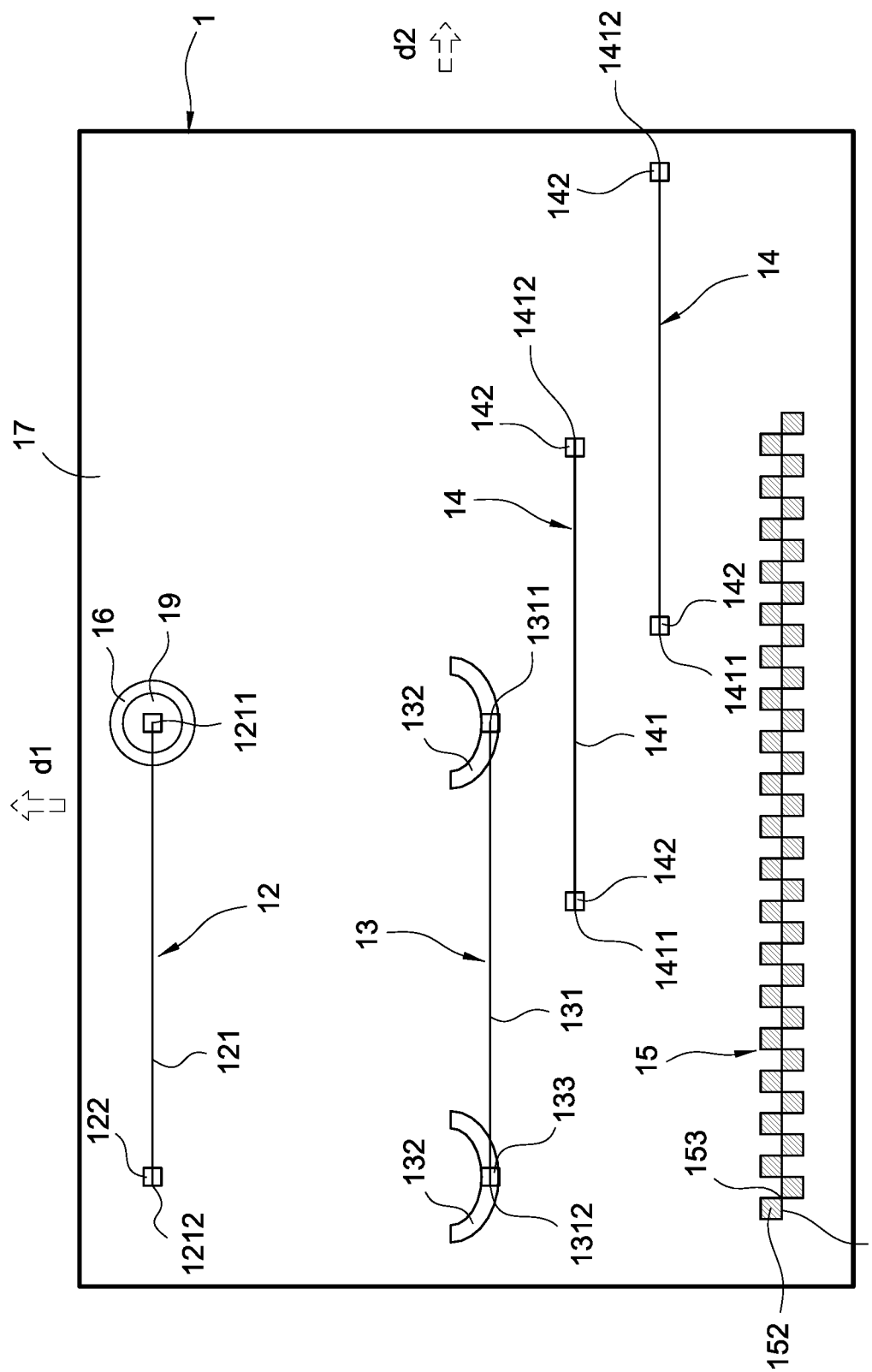
FIG. 18 is a schematic view showing the quantity of the third correction pattern of the present invention is plural.
Figure 19:
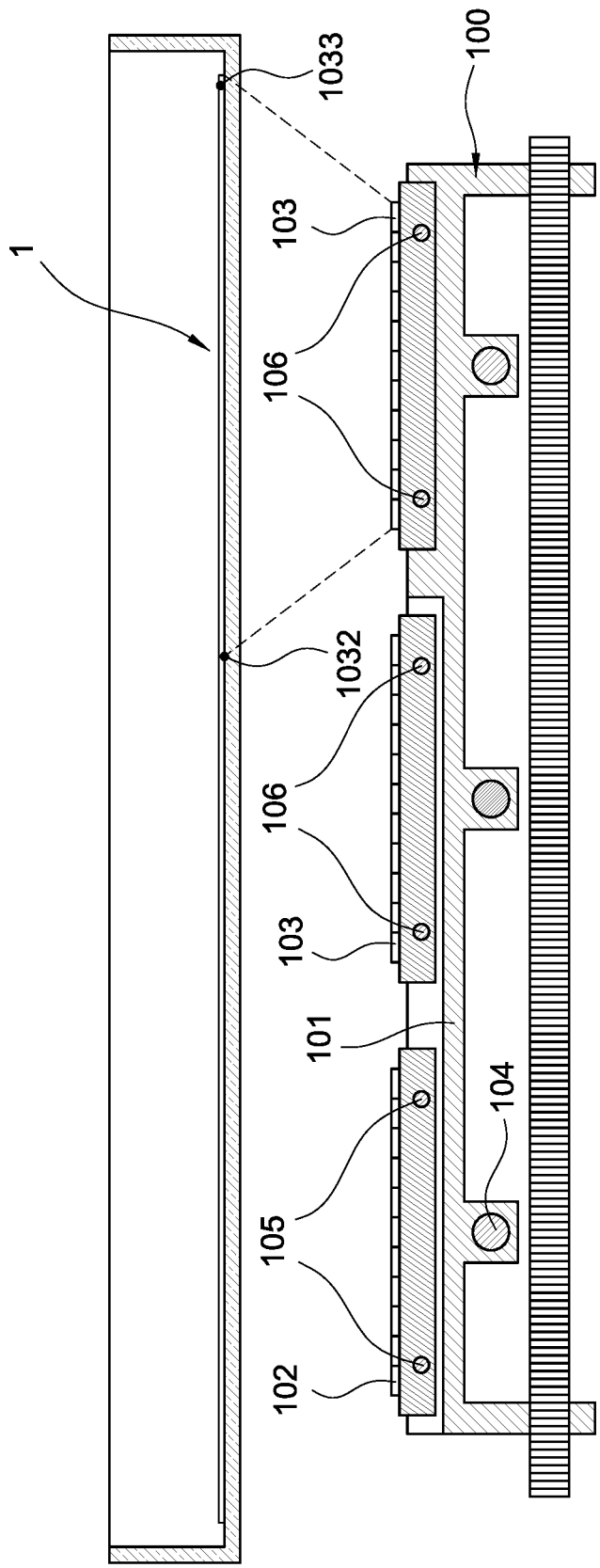
FIG. 19 is a schematic view showing the quantity of the second light source of the present invention is plural.
Figure 20:
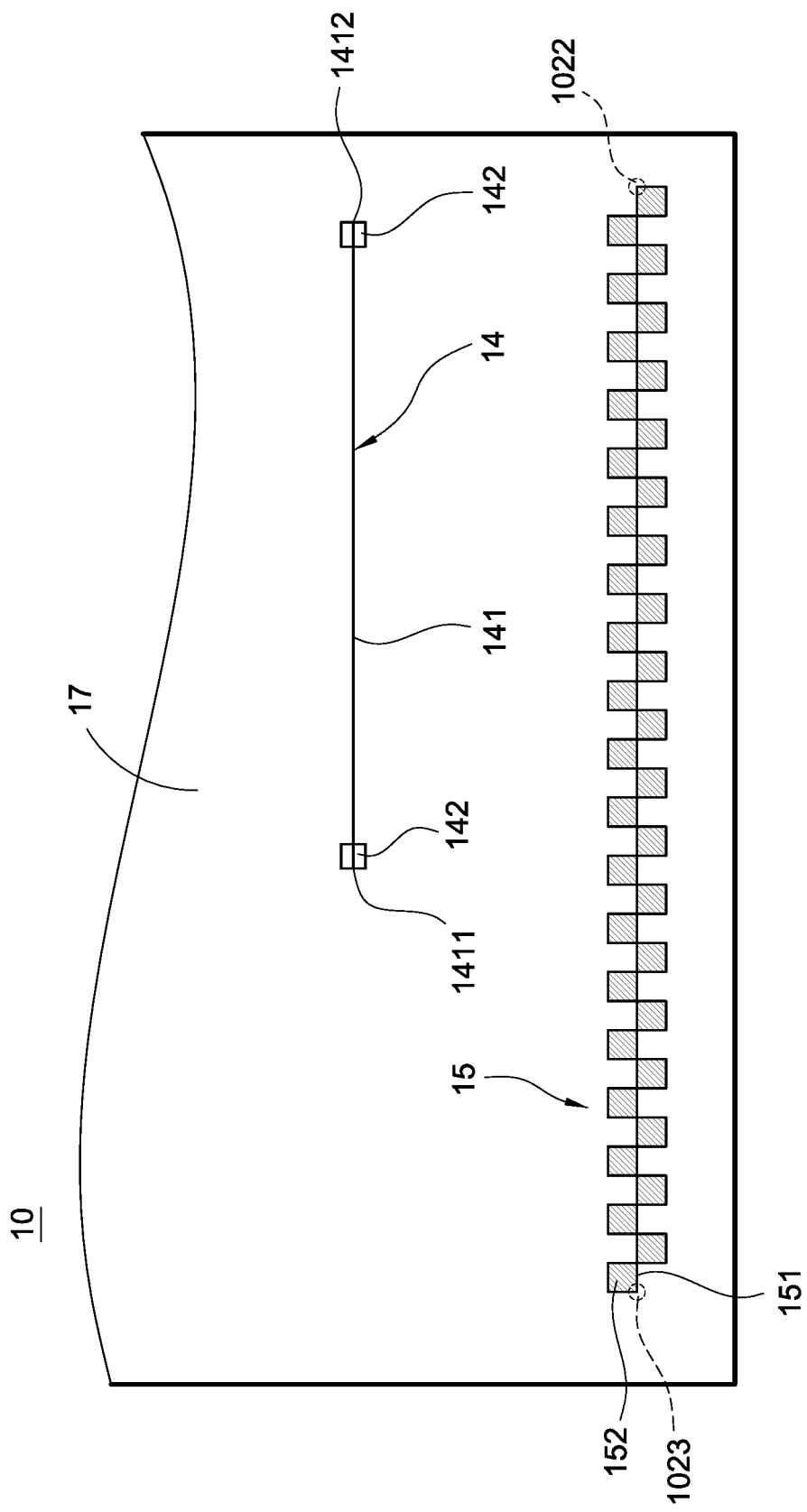
FIG. 20 is a schematic view of the first light source of the present invention moving to a position of the fourth correction pattern.
Figure 21:
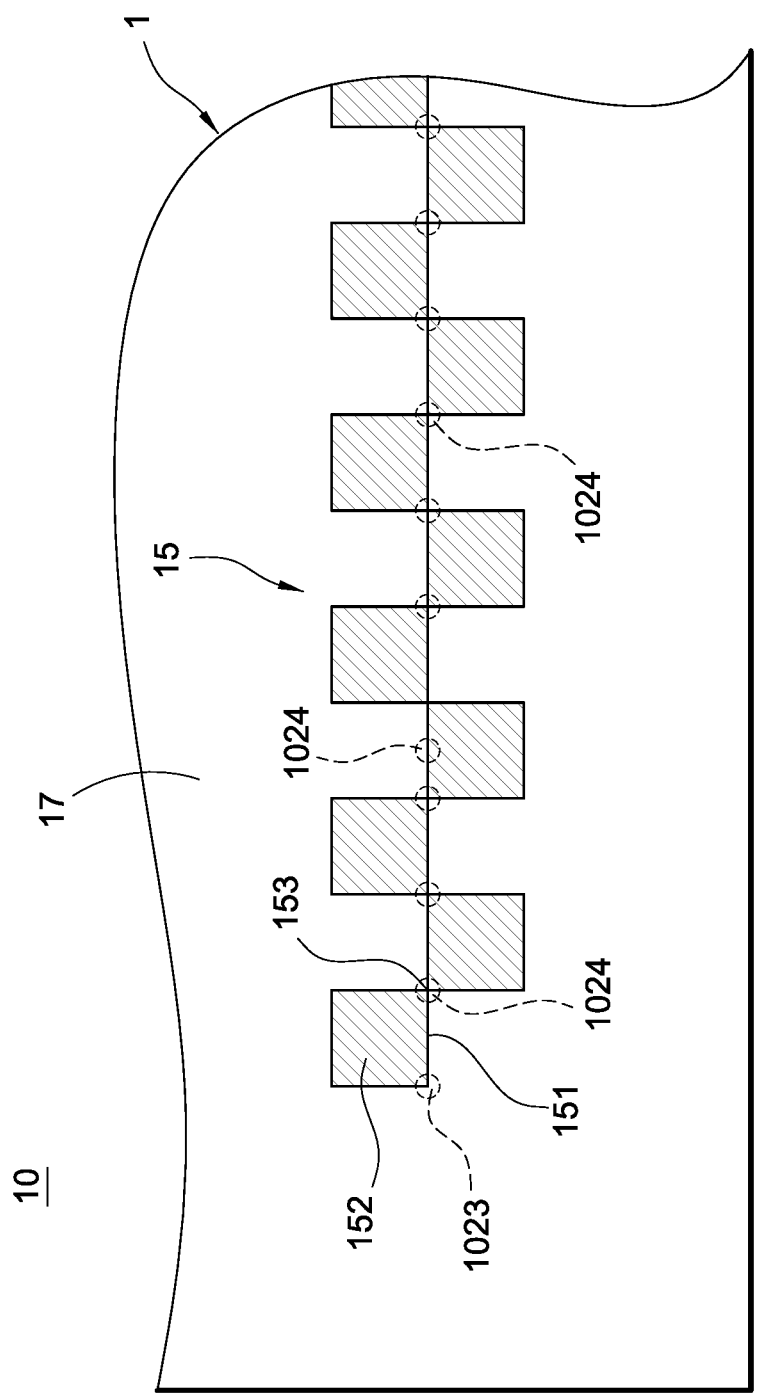
FIG. 21 is a schematic view of the first light source first rear end pixel, second rear end pixel and the first central pixel of the present invention.
Figure 22:
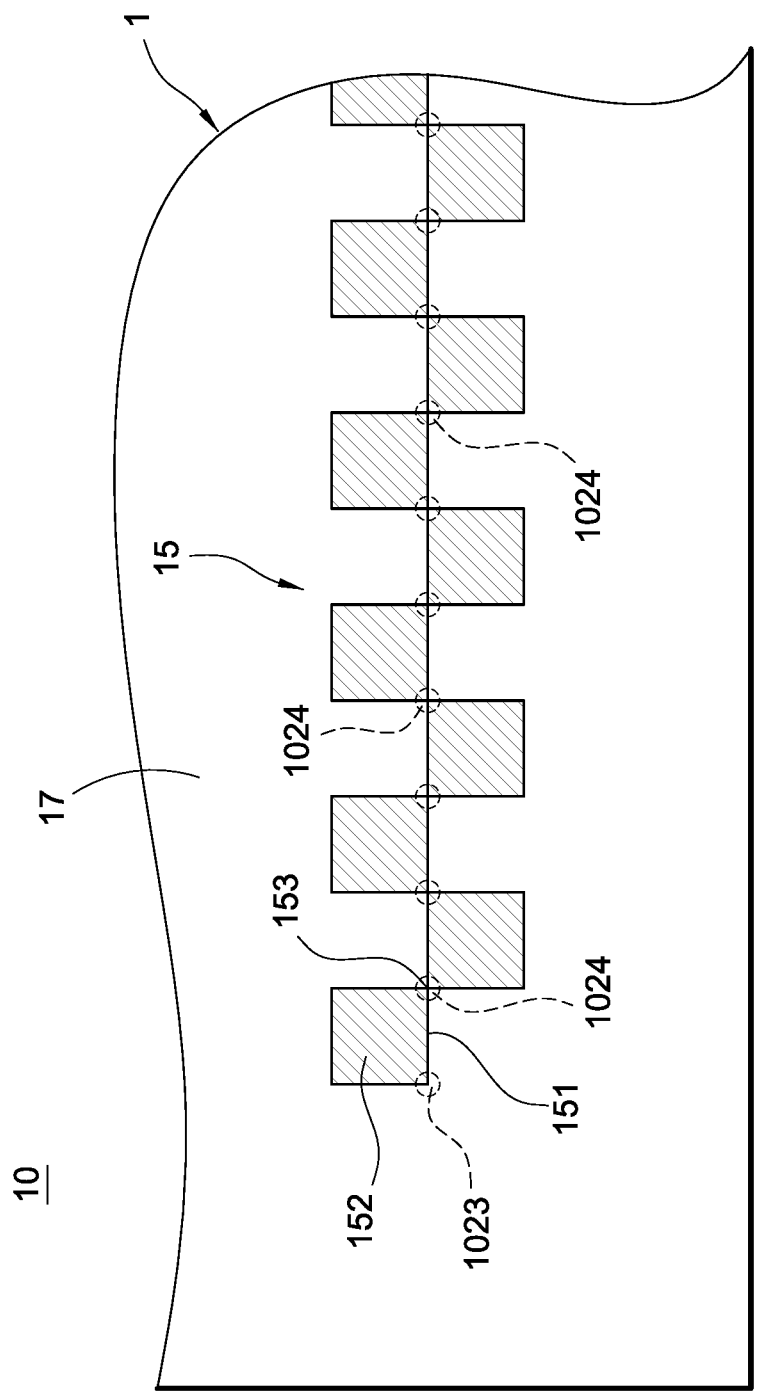
FIG. 22 is a schematic view of the first rear end pixel, the second rear end pixel and the first central pixel of the present invention stacked onto the plurality of intersecting points respectively.

Moreover, as shown in FIG. 18 to FIG. 19, the quantity of the third correction pattern 14 and the second light source 103 as well as the number of repetitive steps of step f) and step g) are plural and identical. Since gaps are formed between the plurality of second light sources 103, the plurality of third straight lines 141 are arranged in misaligned positions with each other.

The correction method for a plurality of second light sources is described in detail as follows. The correction is performed on the second light source 103 most adjacent (first adjacent) to the first light source corresponds to the third correction pattern 14 most adjacent (first adjacent) to the second correction pattern 13 according to the step f) and step g) sequentially. Next, the correction is performed on the second light source 103 second adjacent to the first light source corresponding to the third correction pattern 14 second adjacent to the second correction pattern 13 according to step f) and step g) sequentially. Then, corrections are performed repetitively in such manner according to step f) and step g) in order to complete the correction for a plurality of second light source 103.

In an example embodiment, a method of use of a multiple light source correction apparatus 10 further comprises a step h) following the step g). As shown in step h) of FIG. 1B and FIG. 21 to FIG. 22, the first light source 102 is moved to the position of the fourth correction pattern 15 via the platform 101. The first light source 102 includes a plurality of first central pixels 1024 disposed between the first rear end pixel 1022 and the second rear end pixel 1023. The first rear end pixel 1022, the second rear end pixel 1023 and the plurality of first central pixels 1024 are stacked onto the plurality of intersecting points 153 respectively.

The following provides further details. Since the first rear end pixel 1022, the second rear end pixel 1023 and the plurality of first central pixels 1024 are aligned to form a first light beam, the first rear end pixel 1022, the second rear end pixel 1023 and the plurality of first central pixels 1024 must be jointly stacked onto the first straight line 151. If the first rear end pixel 1022, the second rear end pixel 1023 and the plurality of first central pixels 1024 cannot be stacked onto the fourth straight line 151 jointly, it means that the first driving mechanism 104 has problems such that correction cannot be made; therefore, the light source module 100 can then be recycled directly without further uses.

Furthermore, when the first light source 102 moves to the fourth correction pattern 15 only via the platform 101, the first rear end pixel 1022, the second rear end pixel 1023 and the plurality of first central pixels 1024 may not be stacked onto the plurality of intersecting points 153; however, a flexible member can be used to light up the pixels overlapped on the intersecting points 153 and to reduce the brightness of the pixels that cannot be overlapped on the intersecting points 153; as a result, it is able to achieve the objective of overlapping the first rear end pixel 1022, the second rear end pixel 1023 and the plurality of first central pixels 1024 onto the plurality of intersecting points 153 respectively in order to complete the correction of the pixels of the first light source 102.

In the disclosed example of a method of use of a multiple light source correction apparatus 10, it further comprises a step i) following the step h). As shown in step i) of FIG. 1B, the second light source 103 is moved to the position of the fourth correction pattern 15 via the platform 101. The second light source 103 includes a plurality of second central pixels 1034 disposed between the third rear end pixel 1032 and the fourth rear end pixel 1033. The third rear end pixel 1032, the fourth rear end pixel 1033 and the plurality of second central pixels 1034 are stacked onto the plurality of intersecting points 153 in order to complete the correction for the pixels of the second light source 103. In addition, the correction principle of step i) is similar to that of step h); therefore, relevant details are omitted.

Moreover, the first ring frame 122, the second ring frame 133, the third ring frame 142 and the black grid 152 in this embodiment are of square shapes respectively; however, the present invention is not limited to such shape only. The shapes of the first ring frame 122, the second ring frame 133, the third ring frame 142 and the black grid 152 can also be of the geometric shapes of such as rectangular, polygonal, circular shapes etc. depending upon the actual conditions.

In view of the above, the first correction pattern 12, the second correction pattern 13, the third correction 14 and the fourth correction pattern 15 are jointly formed on the transparent thin plate 1. In addition, the first correction pattern 12, the second correction pattern 13, the third correction 14 and the fourth correction pattern 15 can be accurately corrected for positioning corresponding to multiple light sources in order to reduce the misalignment between the light source and the platform as well as the misalignment among the multiple light sources. Consequently, the advantages of the multiple light source correction apparatus 10 having accurate correction and facilitated operation can be achieved.

Furthermore, with the use of the pattern designs of the first ring frame 122, the U-shaped frames 132, the second ring frame 133, the third ring frame 142 and the fourth straight line 151 etc., defective components can be determined and recycled in order to increase the assembly accuracy percentage of the multiple light source correction apparatus 10.

Moreover, the correction of multiple light sources can be accomplished by performing step a) to step i) sequentially. In addition, if there is any temporary stop due to operation interruptions or recess and breaks, the step of the correction process can be immediately determined by observing the locations of the pixels in the first correction pattern 12, the second correction pattern 13, the third correction pattern 14 and the fourth correction pattern 15; therefore, it is able to swiftly continue the correction operation such that the smoothness of the light source correction is enhanced.

In view of the above, the signal feedback apparatus of the present invention is able to achieve the expected purpose of use and to overcome the drawbacks of prior arts. The present invention is of novelty and inventive step to comply with the patentability of invention patents. The scope of the present invention shall be determined based on the claims defined hereafter, and the scope of the present invention shall cover all equivalent modifications such that it shall not be limited to the descriptions provided above.

What is claimed is:

1. A multiple light source correction apparatus, comprising:

a transparent thin plate (1) having a first correction pattern (12), a second correction pattern (13) and at least one third correction pattern (14); the first correction pattern (12) having a first straight line (121), the first straight line (121) having a first end point (1211) and a second end point (1212) formed at two ends thereof; the second correction pattern (13) having a second straight line (131) and two U-shaped frames (132), the second straight line (131) having a third end point (1311) and a fourth end point (1312) formed on two ends thereof, the two U-shaped frame (132) installed at external portions of the third end point (1311) and the fourth end point (1312) respectively; the third correction pattern (14) having a third straight line (141), the third straight line (141) having a fifth end point (1411) and a sixth end point (1412) formed at two ends thereof; the first straight line (121), the second straight line (131) and the third straight line (141) arranged parallel to each other;

wherein the transparent thin plate (1) comprises a hollow rivet (16), a transparent rotating sheet (17), a transparent horizontal moving sheet (18) and a sticker sheet (19); the hollow rivet (16) includes a hollow opening (161); the transparent rotating sheet (17) and the transparent horizontal moving sheet (18) arranged to stack onto each other and mounted onto the hollow rivet (16); the sticker sheet (19) is attached onto the hollow rivet (16) and covers the hollow opening (161); a portion of the first straight line (121), the second end point (1212), the second correction pattern (13) and the third correction pattern (14) are formed on the transparent rotating sheet (17); another portion of the first straight line (121) and the first end point (1211) are formed on the sticker sheet (19).

2. The multiple light source correction apparatus according to claim 1, wherein the first straight line (121), the second straight line (131) and the third straight line (141) are of equal lengths with each other; the first straight line (121) and the second straight line (131) are arranged in aligned positions with each other; the second straight line (131) and the third straight line (141) are arranged in misaligned positions with each other.

3. The multiple light source correction apparatus according to claim 1, wherein the transparent think plate (1) further comprises a fourth correction pattern (15), the fourth correction pattern (15) includes a fourth straight line (151) and a plurality of black grids (152) arranged at the upper and lower sides of the fourth straight line (151) in an alternating method spaced apart from each other; a plurality of intersecting points (153) formed between the fourth straight line (151) and the plurality of black grids (152).

4. The multiple light source correction apparatus according to claim 1, wherein the first correction pattern (12) further includes a first ring frame (122), a rear section of the first straight line (121) adjacent to the second end point (1212) is received inside the first ring frame (122), and the second end point (1212) is stacked onto the first ring frame (122).

5. The multiple light source correction apparatus according to claim 1, wherein the second correction pattern (13) further includes a second ring frame (133), the second ring frame (133) is received at a central portion inside the U-shaped frame (132), a rear section of the second straight line (131) adjacent to the fourth end point (1312) is received inside the second ring frame (133), and the fourth end point (1312) is stacked onto the second ring frame (133).

6. The multiple light source correction apparatus according to claim 1, wherein the third correction pattern (14) further includes two third ring frames (142), two rear sections of the third straight line (141) are received inside the two third ring frames (142) respectively, and the fifth end point (1411) is stacked onto one of the third ring frames (142), and the sixth end point (1412) is stacked onto another one of the third ring frames (142).

7. The multiple light source correction apparatus according to claim 1, wherein a quantity of the third correction pattern (14) is plural, and the plurality of third straight lights (141) are arranged in misaligned positions with each other.

\* \* \* \* \*